United States Patent [19]

Eckersley et al.

[11] Patent Number: 4,739,969
[45] Date of Patent: Apr. 26, 1988

[54] LIFT SHEAVE

[75] Inventors: Gregory Eckersley, Kew; Maxwell T. Jones, Cheltenham, both of Australia

[73] Assignee: Johns Perry Industries Pty. Ltd., Cheltenham, Australia

[21] Appl. No.: 926,538

[22] Filed: Nov. 4, 1986

[30] Foreign Application Priority Data

Nov. 4, 1985 [AU] Australia .............................. PH3233

[51] Int. Cl.⁴ .............................................. B66D 5/08
[52] U.S. Cl. ...................................... 254/378; 187/27; 187/115; 188/171; 254/362
[58] Field of Search ................... 187/20, 27, 108, 115, 187/131; 188/171, 173, 163; 254/362, 378

[56] References Cited

U.S. PATENT DOCUMENTS

| | | | |
|---|---|---|---|
| 1,171,964 | 2/1916 | Lindstrom | 254/378 X |
| 1,869,152 | 7/1932 | Jones | 254/362 X |
| 1,929,914 | 10/1933 | Coberly et al. | 188/171 |
| 3,323,607 | 6/1967 | Bruns et al. | 187/131 X |
| 3,847,251 | 11/1974 | Maltky et al. | 187/115 |
| 4,042,068 | 8/1977 | Ostrander et al. | 187/115 |
| 4,337,848 | 7/1982 | Kindler | 187/115 |
| 4,355,785 | 10/1982 | Tosato et al. | 187/20 X |
| 4,368,501 | 1/1983 | Gingrich | 187/108 X |
| 4,520,906 | 6/1985 | Watanabe | 187/115 |

Primary Examiner—Stuart S. Levy
Assistant Examiner—Katherine Matecki
Attorney, Agent, or Firm—Dennison, Meserole, Pollack & Scheiner

[57] ABSTRACT

A lift sheave arrangement is disclosed which includes a static shaft and a sheave mounted for rotation about the static shaft. The sheave has a first portion for receiving a cable which is to be connected to a lift car and a second portion which includes a brake on its inner circumference. A motor, the brake and second portion for driving the sheave about the static shaft are arranged in the same plane normal to the shaft. The motor has a plurality of movable magnets and a plurality of stationary magnets. The brake drum of the brake includes part of the magnetic circuit between adjacent magnetic elements in the movable magnetic elements.

A magnetic actuator is arranged for allowing movement of the brake to apply the brakes and a sensor is provided for sensing the magnetic flux in the actuator when the actuator is actuated to move the brake so that a control circuit can vary the voltage applied to the actuator to enable the brake to move smoothly under the influence of the actuator. The sheave arrangement also includes a sensor for sensing the load on the brake when the brake is holding the sheave stationary so that the motor can be pre-excited in accordance with the load sensed by the sensing means to enable the car to move smoothly when the brake is released.

11 Claims, 7 Drawing Sheets

LIFT SHEAVE

This invention relates to a lift sheave for raising and lowering lift cars in a lift well.

Lift sheaves are well known and generally include a first portion about which a cable is driven by rotation of the sheave to raise and lower a lift car. The sheave may include a reduced diameter portion for receiving the cable and a larger diameter portion which includes a brake surface for engagement by brake shoes, arranged outwardly of the sheave, for stopping rotation of the sheave to hold a lift car at a desired position in the lift well. The sheave is driven by a motor via a rotatable shaft upon which the sheave is mounted. The rotatable shaft is relatively long since it passes through the motor and the sheave and the shaft is supported by suitable bearings at its ends and usually at an intermediate position between the motor and the sheave. The motor is actuated to rotate the shaft and thereby rotate the sheave to raise or lower the lift car. In order to stop the lift car at a desired position the motor is stopped and the brake shoes which are biased against the brake surface on the sheave, engage the sheave to hold the lift at the desired position. When it is desired to move the lift car the motor is activated and the brake shoes are biased away from the brake surface by a solenoid to allow the sheave to rotate so the lift car can be moved.

Conventional sheave and motor arrangements suffer from a number of drawbacks. The first drawback is concerned with the need to provide a relatively long drive shaft which is driven by the motor. In conventional sheave and motor arrangements the arrangements are therefore large and the fact that a relatively long shaft is provided means that the shaft must generally be very accurately aligned. Any misalignment can cause damage to the shaft, the sheave, and/or the motor. Furthermore, due to the loads applied to the shaft any imperfection in the shaft may lead to fracture of the shaft.

The object of this invention is to provide a sheave for raising and lowering a lift car which does not suffer from the abovementioned drawbacks.

The invention may be said to reside in a sheave arrangement for raising and lowering a lift car, said sheave arrangement being mounted on a static shaft and including a sheave having a first portion for receiving a cable which is adapted to be coupled to the lift car, said sheave having a second portion having a drive means arranged radially adjacent thereto for rotating said sheave and a third portion of said sheave having brake means arranged adjacent thereto for holding said sheave stationery with respect to said shaft, said first and second portions of the sheave, and therefore said drive means and brake means, being coplanar in a plane substantially normal to the shaft.

Since the sheave arrangement of this invention includes a static shaft and the drive means is arranged radially adjacent to a portion of the sheave the shaft can be made small and the device is therefore very compact. In view of the compact structure of the sheave, according to this invention, the sheave will be economic to manufacture and can be installed in limited space whilst overcoming problems associated with the need to provide a relatively long rotatably driven drive shaft. Furthermore, since the drive shaft is a static shaft the loads supplied to the shaft are not as great or have components in the same directions as in the case of driven drive shafts and the drive shaft is therefore unlikely to fracture and is easy to mount.

Preferably the second and third portions of the sheave are inner and outer surfaces of the sheave which are axially spaced from said first portion of the sheave.

Preferably the drive means is arranged adjacent to the outer surface of the sheave and the brake means is arranged adjacent to the inner surface of the sheave and includes brake shoes which can be driven against the inner surface of the sheave to stop the sheave.

Preferably the drive means is a drive motor and the drive motor is either a synchronous motor or an induction motor.

Preferably the sheave includes support arms which extend radially outwardly from said shaft for supporting windings of said drive motor about the circumference of the outer surface of the sheave.

Preferably the support means holds actuators such as solenoids, which hold said brake shoes away from the inner surface of the second portion of the sheave against the bias of biasing means, such as a spring, which bias the brake shoes towards the inner surface of the sheave, said actuators being deactivated when the lift car is stopped so that the brake shoes are biased by the biasing means against the inner surface of the sheave to prevent rotation of the sheave.

A further problem associated with sheaves for driving lift cars is concerned with application of the brake to stop and hold the lift car at a desired level in a lift well. Since most brakes are operated by means of a solenoid or other magnetic device, the brake tends to be applied or released with a sudden jerk when the solenoid is actuated because the magnetic flux in the solenoid increases as the brake is drawn towards the solenoid and reduces rapidly as the brake moves away from the solenoid. Therefore the brakes tend to be released or applied very quickly. This can result in shuddering of the lift car or jerking of the lift car when the brake is applied or released.

An object of a further aspect of this invention is to overcome this problem.

The invention, in a further aspect provides a sheave arrangement for raising and lowering a lift car, said sheave arrangement having a sheave for receiving a cable which is adapted to be coupled to a lift car, a drive means for rotating the sheave and brake means for stopping and holding said sheave stationary, said brake means including a brake element and a magnetic actuator for allowing movement of said brake element sensing means for sensing the magnetic flux in said actuator when the actuator is actuated to move the brake element and control means for varying the voltage applied to the actuator to, in turn, vary the magnetic flux as the brake element is moved under the influence of the actuator so that the brake element is moved smoothly.

Since the magnetic flux is varied in the actuator, the amount of flux which causes the brake element to move can be decreased as the brake element is moved under the influence of the magnetic flux to cause the brake element to move smoothly into a braking position and/or to be released smoothly rather than to move abruptly upon release or slam against a brake surface of the sheave.

Preferably, the actuator is a solenoid or electro-magnet and the magnetic flux sensor is a Hall effect device for sensing the magnetic flex, a magneto resistor for sensing the magnetic flux, a pick-up coil for sensing the magnetic flux or magneto optic device such as a Kerr effect device for sensing the magnetic flux. The position of the brake element may be derived from the relationship between coil magneto-motive force and the flux. Alternatively, the magnetic flux may be sensed by means of a position sensor which detects the position of the brake element and enables the magnetic flux to be estimated based on the position of the brake element relative to the solenoid.

The present invention is also very much concerned with providing a relatively small and compact sheave arrangement. The aspects of the invention described above do result in a more compact sheave arrangement than has been proposed in the past. However, a further aspect of the invention is concerned with further reducing the size of the sheave arrangement.

A third aspect of the invention provides a sheave arrangement for raising and lowering a lift car, said sheave arrangement having a sheave mounted for rotation by a drive means, said sheave having a portion for receiving a cable which is adapted to be coupled to a lift car, drive means for rotating said sheave and brake means for stopping and holding said sheave stationary, said drive means including a plurality of stationary magnetic elements and a plurality of magnetic elements arranged for movement relative to the stationary magnetic elements, said brake means being arranged in proximity to said movable magnetic elements so that said brake means forms part of the magnetic circuit between adjacent magnetic elements in said plurality of movable magnetic elements.

The above arrangement avoids the need to utilize a separate magnetic core for completing the magnetic circuit between the plurality of movable magnetic elements and therefore assists in decreasing the weight and size of the sheave arrangement according to this aspect of the invention.

The magnetic elements may be electro-magnets, permanent magnets or flux switches.

Preferably the brake means includes a brake drum and a movable brake shoe, said brake drum being arranged adjacent said movable magnetic elements and said brake drum completing the magnetic circuit between adjacent magnetic elements.

A further aspect of this invention is concerned with pre-exciting the motor whilst the brake is applied so that the load in a lift car is balanced by the pre-excitation of the motor when the brake is released. Conventional sheave arrangements and lifts do include a system for achieving this result. However, the conventional systems generally utilize a device for measuring the weight or load in the lift car and then pre-exciting the motor to compensate for that load so that when the brake is released the excitation of the motor is sufficient to enable the lift car to move smoothly aware from the stationary position. If the motor is not pre-excited there is small delay after release of the brake before the motor commences to move the lift car which means that the lift car may be jerked or dropped or raised slightly before the motor is energized to move the lift car. The conventional technique of measuring the car weight or load does not always provide an accurate indication of the amount of pre-excitation which is required.

A further aspect of the present invention provides a sheave arrangement for raising and lowering a lift car, said sheave arrangement having a sheave said sheave having a portion for receiving a cable adapted to be coupled to a lift car, drive means for driving said sheave and brake means for stopping and holding said sheave stationary, sensor means for sensing the load on said brake means when the brake means is holding said sheave stationary and control means for pre-exciting said drive means in accordance with the load sensed by the load sensing means.

Since this aspect of the invention senses the load on the brake means a very accurate indication of the amount of pre-excitation required to balance the motor and lift car after the brake is released can be obtained. Therefore, the correct amount of pre-excitation can be applied to the motor to ensure that the lift car is smoothly moved from the stationary position when the brake is released.

A preferred embodiment of the invention will be described in detail with reference to the following drawings in which.

With reference to FIGS. 1 to 4 the sheave arrangement 10 includes a sheave 11 having a first portion 12 which is mounted on a static shaft 14. The first portion 12 may include grooves 16 on its outer circumference for receiving a cable shown schematically at 18 which is adapted to be coupled to a lift car (not shown). The first portion 12 of the sheave has an integral second portion 20 which is of larger diameter than the first portion 12 and is axially spaced from the first portion 12. The first portion 12 may include surfaces 22 and 24 which are machined for a reader disk and for sliprings respectively.

The shaft 14 is mounted by a pair of mounting brackets 30 which are supported on rails 32 which are adapted to be secured at the top of a lift well (not shown). The first portion 12 may include bearings 34 for rotatably supporting the first portion 12 on the shaft 14. Three support arms 40, 42 and 44 are mounted on shaft 14 and extend radially outwardly thereof. The outer ends of the support arms 40 to 44 extend generally parallel to the shaft 14 and support a plurality of laminations 46 which in turn support windings of a drive motor for driving the sheave portions 12 and 20 about shaft 24.

The internal surface 21 of the second portion 20 forms a surface or brake drum for receiving a brake shoe 50 which is biased against the inner surface 21 of the second portion 20. The brake shoe 50 is pivotally coupled at one end to a pivot pin 52 on a support member 54 which is secured to shaft 14. The other end of the brake shoe 50 is pivotally coupled on a pin 55 which is retained on a stud 56 secured to a plate 58. The plate 58 is in turn clamped to shaft 14 by a clamp assembly 60.

The brake 50 includes a drive arm 62 which is pivotally coupled to an adjustment mechanism 64 by a pivot pin 66. The adjustment mechanism 64 includes a plate 68 which has a pin 71 and which is coupled to the brake shoe 50. It should be noted that another brake shoe 50 is provided on the diametrically opposite side of the inner surface 21 of the portion 20 (see FIG. 3). The drive arm 62 has at its free end a solenoid 70 which when activated draws the drive arm 62 in a direction to move the brake shoe 50 away from the inner surface 21. The drive arm 62 of the diametrically opposite brake shoe 50 also includes a solenoid represented by reference 72 for drawing that brake shoe away from the inner surface 21. A spring 57 is arranged to bias the brake shoes towards the inner surface 21 of the second portion 20 such that when the solenoid 70 and 72 are deactivated the brake shoes 50 are free to move under the bias of the spring 57 into engagement with the inner surface 21 to prevent rotation of the sheave.

Accordingly, in order to rotate the sheave to raise or lower a lift car the drive motor which is arranged radially outwardly of the second portion 20 and which is supported by the support arms 40 to 44, is activated to rotate the sheave about the shaft 14 and thereby raise a lift car (not shown) which is coupled to the cable 18. To stop the lift car at a desired position in a lift well, such as at a floor level, the motor 21 is deactivated to stop the lift car and the solenoids 70 and 72 are deactivated to enable the spring to bias brake shoes 50 into engagement with the inner surface 21 of the portion 20 to prevent rotation of the sheave. When it is desired to continue movement of the lift car, the solenoids 70 and 72 are activated to draw the brake shoes 50 away from inner surface 21 against the bias of the spring and the motor is activated to drive the sheave to raise or lower the lift car.

This embodiment of this invention therefore has the advantage that the arrangement is extremely compact in view of the drive motor, the second portion 20 of the sheave and the brake being in a generally radial plane and all being generally co-planar. In view of this arrangement the static shaft is relatively small and the arrangement is therefore very compact. Furthermore, the loads which are applied to the shaft 14 are unlikely to damage or fracture the shaft.

Figure 1:
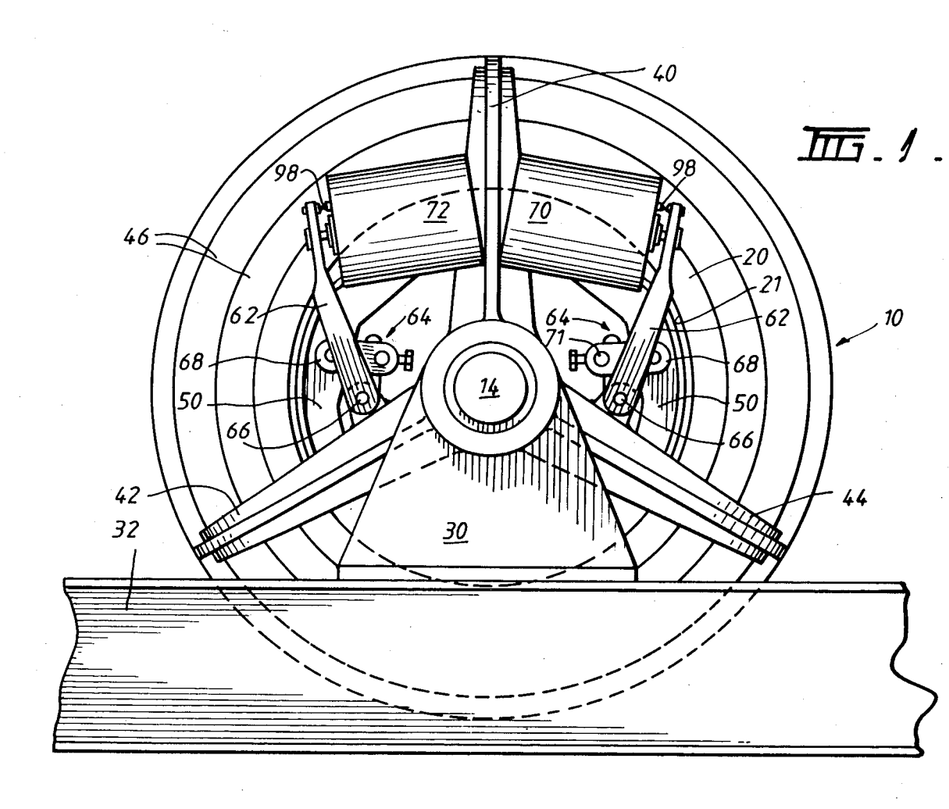
FIG. 1 is a front view of a sheave embodying the invention.
Figure 2:
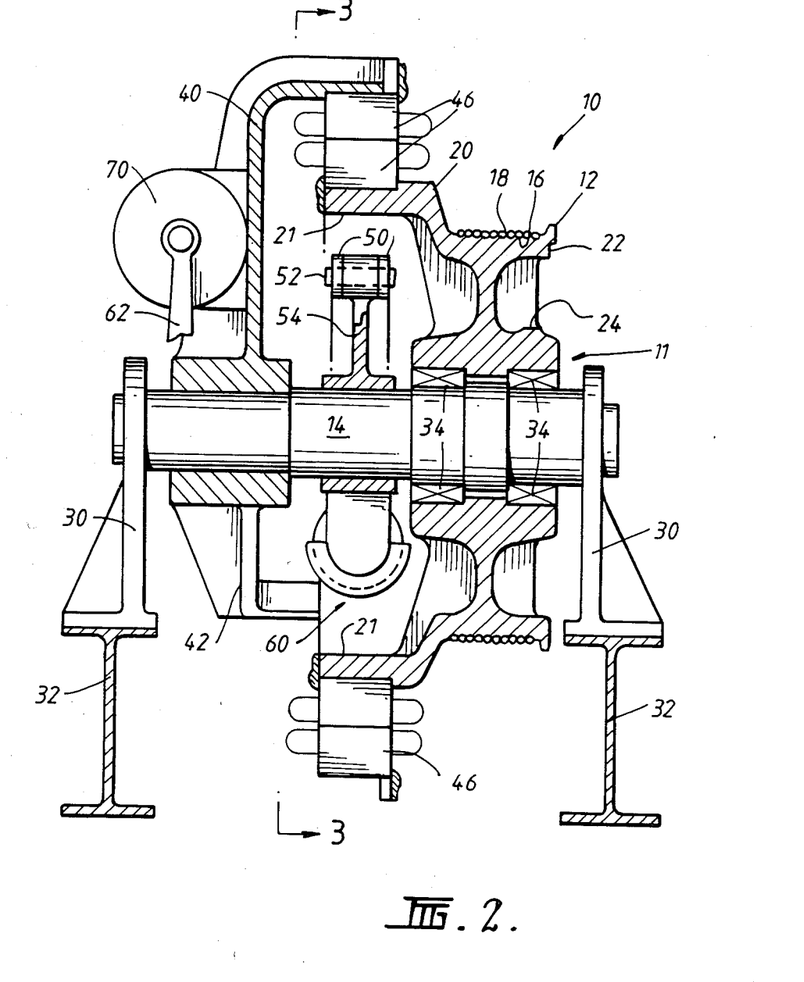
FIG. 2 is a cross-sectional view of the sheave of Figure.
Figure 3:
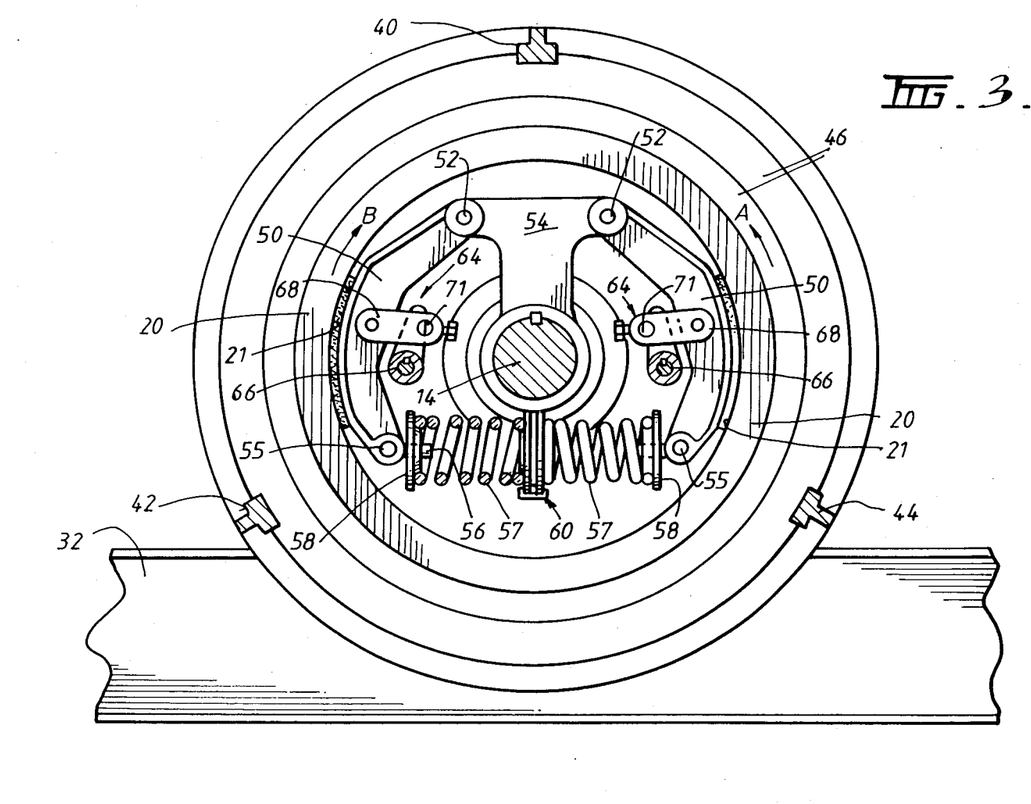
FIG. 3 is a view along the line 3—3 of FIG. 2.

A further advantage of this embodiment of the invention is that mechanical amplification of the braking power can be provided in one direction of rotation of the sheave. In this regard the brake shoes 50 can be arranged relative to the inner surface 21 of the portion 20 such that the sheave can be rotated to raise or lower a lift car by releasing one of the brake shoes and by activating the drive motor to rotate the sheave against the other brake shoe. As is shown in FIG. 3 the configuration of the brake shoe 50 will enable slipping of the sheave in one direction since rotation of the sheave in the direction of arrow A will cause the brake shoe 50 to lock securely against the inner surface 21 of the second portion 20 whereas rotation of the sheave in the direction of arrow B will allow slipping of the brake shoe 50 against the inner surface 21. Thus if one of the brake shoes 50 is released slippage in one direction can occur. This may be advantageous when a lift stops at a floor since when the lift is loaded by people walking into the lift car the weight of the people in the car can cause stretching of the cable which causes the lift car to drop slightly relative to floor level. By releasing an appropriate one of the brakes 50 and activating the drive motor, slippage can occur in one direction to move the lift car so that it is releveled with the floor at which the car is stopped.

The embodiment shown in FIGS. 5 to 8 is similar to that previously described and like reference numerals represent like parts to those shown in the previous embodiment. In this embodiment details of the drive motor M is more fully described. The drive motor generally comprises a plurality of stationary magnetic elements 90 which are spaced apart by coils 92. Arranged radially inwardly of the magnetic elements 90 are a plurality of movable magnetic elements 94 which are mounted on the portion 20 of the sheave which forms a drum of the brake for stopping and holding the sheave. Caps 95 hold the element 94 in place and also serve to secure coils 96 between the elements 94. The magnetic elements 94 may be electromagnets, permanent magnets or flux switches. If the magnetic elements 94 are electromagnets it is preferred to include the coils 96 between adjacent elements 94. However if the elements are permanent magnets or flux switches then coils need not be used and spaces may merely be provided between the magnetic elements. The magnetic elements 94 are arranged adjacent to the portion 20 of the sheave which forms the drum brake against which the brake shoes 50 apply a braking force to stop rotation of the sheave and hold the sheave stationary. The portion 20 of the sheave completes the magnetic path between adjacent elements 94. In order to drive the sheave the elements 90 are excited in a predetermined sequence by known means and in a known manner to cause one of the elements 94 to move towards the excited element 90. By continued excitation of the elements in a particular pattern, the movement of the elements 94 and the second portion 20 to which the elements 94 are coupled enables the portion 20 to rotate about the shaft 14. By the appropriate control of excitation of the elements 90, the rotation may be in either direction enabling a lift to be raised or lowered.

The electro-magnet 70 for actuating the brake shoes 50 via the drive arm 62 includes a flux sensor shown schematically at 98 for sensing the flux between the electro-magnet and the drive arm 62. A position sensor (not shown) may also be arranged to sense the position of the drive arm 62 relative to drive an electro-magnet 70 which is used in this embodiment in place of the electro-magnet of FIGS. 1 and 2. The flux sensor and/or the position sensor is utilized to cause smooth actuation of the brake.

Figure 7:
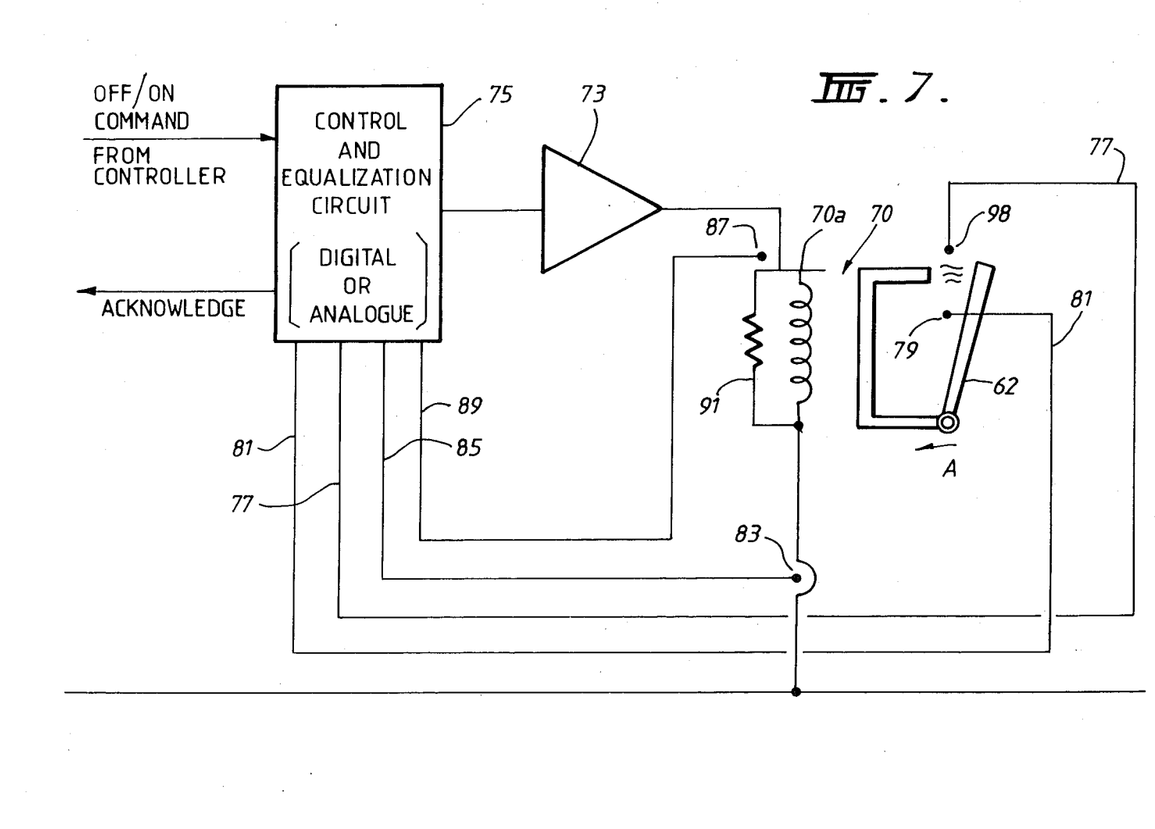
FIG. 7 is a circuit diagram illustrating operation of one aspect of the embodiment of FIG. 3.

FIG. 7 shows a circuit diagram for controlling operation of the brake. With reference to FIG. 7, the electro-magnet 70 includes a magnetic coil 70a which is powered by a power amplifier or driver 73. The power amplifier receives a signal from a control and equalization circuit or from a digital or analogue computer 75. Since such computers and control circuits are well known full details need not be given herein. The flux sensor 98 is arranged to sense the flux between the electro-magnet 70 and the drive arm 62. (It should be noted that the electro-magnet is shown in electrical form and represented by reference 70a and in to the right in mechanical form. The flux sensor is coupled to the control and equalization circuit 75 via line 77. The position sensor represented by reference 79 in FIG. 7 is coupled to sense the position of the drive arm 62 relative to the electro-magnet 70. The position sensor is coupled to the control and equalization circuit 75 via line 81. A current sensor 83 is arranged to sense the current passing through the magnetic coil 70a. The current sensor 83 is connected to the control and equalization circuit 75 via line 85. A voltage sensor 87 detects the voltage applied to the magnetic coil 70a and is coupled to the control and equalization circuit via line 89. A damping resistor or damping strap 91 may be arranged in parallel to the magnetic coil 70a.

The flux sensor 98 may be a Hall effect device, a magneto resistor, a pickup coil or a magneto optic device such as a Kerr effect device. The flux sensor detects the magnetic flux between the electro-magnet 70 and the drive arm 62 and applies a signal indicative of the flux strength to the circuit 75. When an on/off command is applied to the control circuit 75 from the main lift controller to cause the brake to be released or applied, a signal is outputted from the control and equalization circuit 75 to the power amplifier 73 and then to the magnetic coil 70a. Assuming that the brake is to be released so that the sheave can rotate the arm 62 is drawn by the electro-magnet 70 in the direction of arrow A to cause the arm 62 to release the brake shoe 50. If the current supplied from the power amplifier 73 is not altered then as the arm 62 moves towards the electro-magnet 70 flux will increase and the arm 62 will tend to slam shut causing a rapid release of the brake shoe 50 from the brake drum 20. However, in this embodiment of the invention the flux between the electro-magnet 70 and the arm 62 is sensed and as the flux increases the flux sensor 98 applies a corresponding signal to the control and equalization circuit 75 which in turn causes the voltage outputted from the power amplifier 73 to reduce to thereby decrease the amount of magnetic flux and this causes the arm 62 to move smoothly towards the electro-magnet and not to slam closed against the electro-magnet. Thus the brake is smoothly released. The current sensor 83 senses that the current passing through the magnetic coil 70a is being reduced as does the voltage sensor 87. Once the brake has been released an acknowledgment signal is supplied from the control and equalization circuit 75.

Similarly, when the brake is released the flux is sensed and as the arm 62 moves away from the electro-magnet 70 the flux can be increased so that the arm 62 moves the brake shoe 50 smoothly away from the drum 20.

Instead of using the flux sensor 98 to provide an indication of the flux between the arm 62 and electro-magnet 70, the position sensor 79 may be used to provide an indication of flux by sensing the position of the arm 62 relative to the electro-magnet 70 and then determining from that position the flux between the electro-magnet 70 and the arm 62. Thus, the position sensor may be used instead of the flux sensor in order to sense the flux between the arm 62 and the electro-magnet 70. Alternatively, the flux sensor could be used to determine the position of the arm 62 by deriving the position from the relationship between coil magneto-motive force and the flux.

Figure 4:
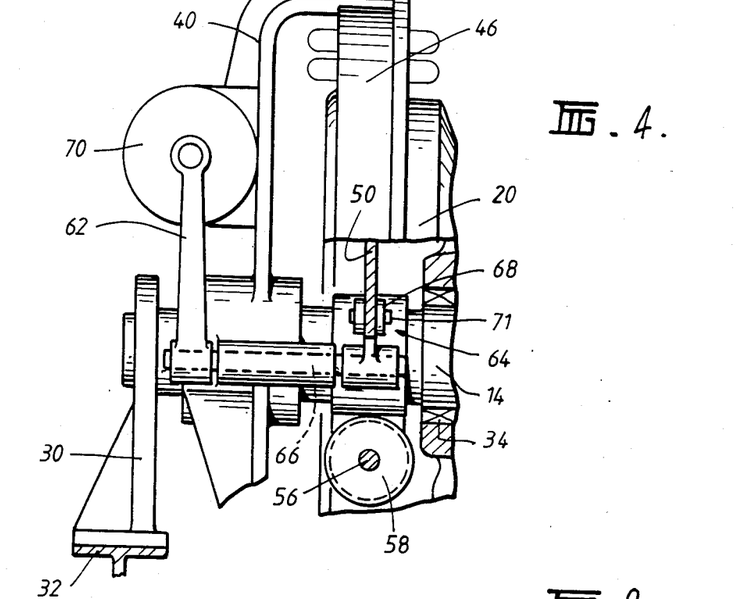
FIG. 4 is a more detailed view of part of FIG. 2.
Figure 5:
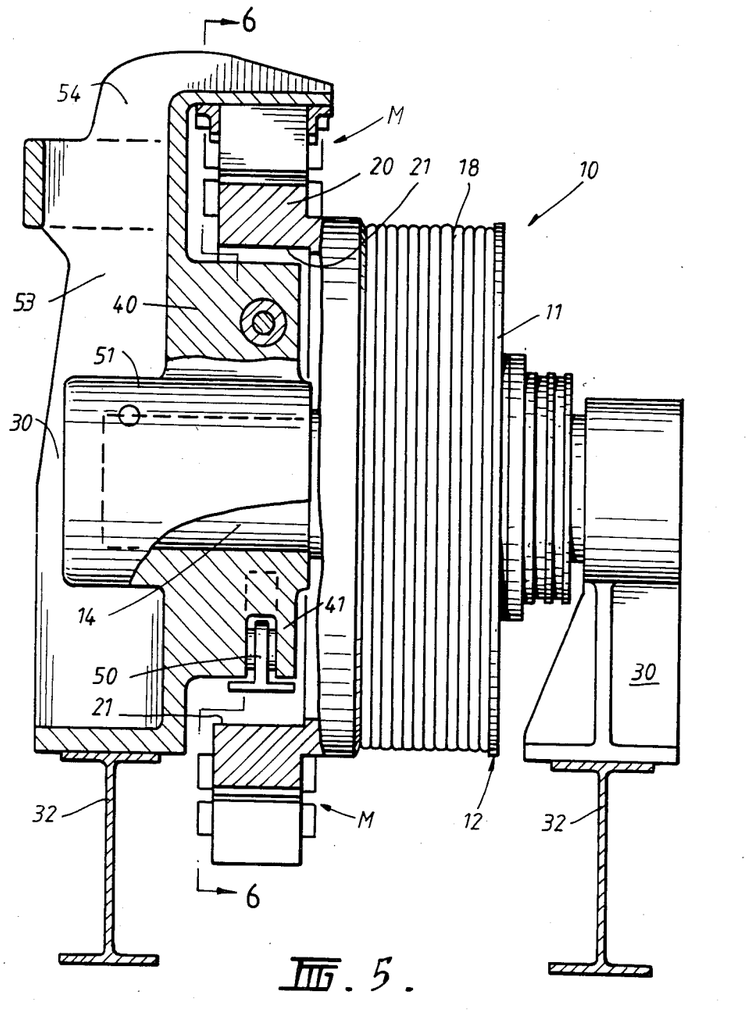
FIG. 5 is a view similar to FIG. 2 showing further developments to the embodiment described with reference to Figure and further illustrating various components of the embodiment of Figure and FIG. 2.
Figure 6:
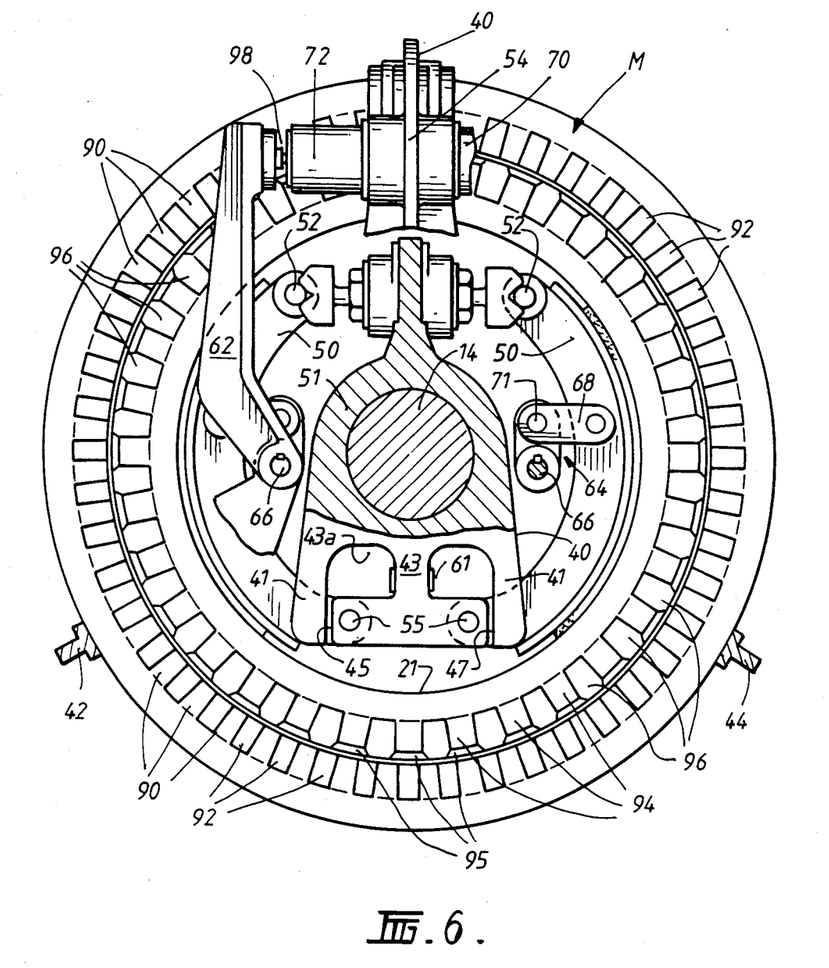
FIG. 6 is a cross-sectional view of the sheave of FIG. 5.

The circuit described with reference to FIG. 4 enables smooth operation of the brake and therefore ensures smooth movement of a lift car utilizing the sheave of this embodiment of the invention.

Figure 8:
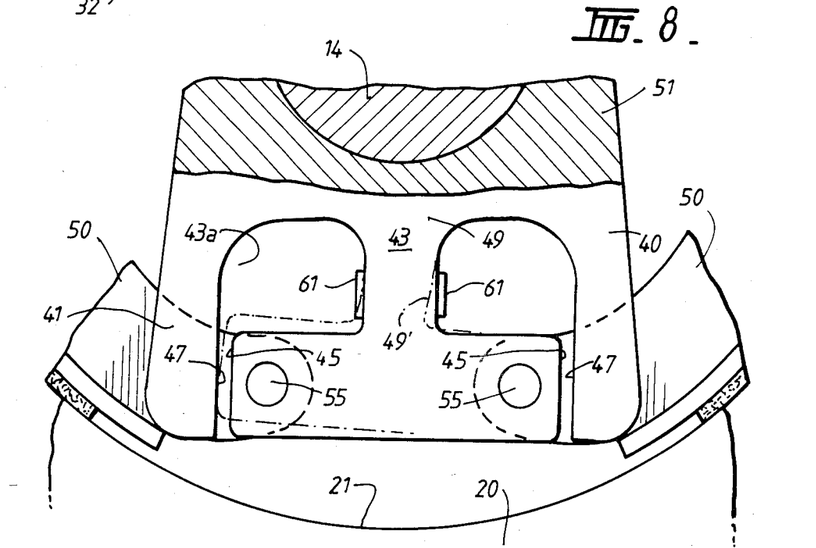
FIG. 8 is a detailed view of part of the embodiment of FIG. 3.

FIG. 8 shows a detailed portion of the support arm 40 which surround the shaft 14. In the embodiment of FIGS. 5 to 8 the support arm is configured differently to that shown in FIGS. 1 and 2. The support arm 40 has an inner hub portion 51 which receives the shaft 14. The hub portion 51 has an integral arm 53 with a flange 56 for supporting the magnetic elements 90 and coils 92. The hub portion 51 of the support arm 40 includes a pair of lugs 41 which define a space 43a therebetween. Integral with the lugs 41 is a T-shaped portion 43 which has two ends 45 spaced a small distance from internal surfaces 47 of the lugs 41. The ends of the T-shaped portion have the brake shoes 50 pivoted thereto on pivot pins 55. Arranged on a stem 49 of the T-shaped portion 43 are strain gauges 61 which measure the load on the brake shoes 50. When the brakes are applied the load acting on the brakes 50 will be transmitted to the T-shaped portion 43 and will tend to cause the T-shaped portion 43 to move as shown by dotted lines and reference by numeral 49'. It should be noted that the movement is exaggerated is FIG. 8 for the purposes of illustration. The strain gauges 61 will detect the amount of movement and will produce a signal indicative of the amount of movement which, in turn, is indicative of the amount of load acting on the brakes 50.

The space between the end portions 45 and surfaces 47 is to allow for an amount of movement equal to a fully loaded lift car. If the lift car is overloaded and there is more load on the brake than is intended the end portions 45 of the T-shaped portion 43 will abut against one of the surfaces 47 to prevent further movement of the T-shaped portion 43 and prevent permanent deformation or breakage of the T-shaped portion 43. The output of the strain gauges 61 is applied to the lift control system so that an appropriate amount of pre-excitation may be applied to the motor M to cause the motor M to be in balance with the load applied to the brakes 50 and therefore the load in the lift car. When the brakes are released the lift car may therefore be moved smoothly and will not tend to drop slightly, raise slightly or jerk.

The preferred embodiments of the present invention therefore provide a lift sheave which is smaller and lighter compared to previous lift sheaves and in particular to a lift sheave which does not require a heavy base plate to reinforce the sheave which makes up a considerable part of the weight of some conventional sheave arrangements.

Since modification within the spirit and scope of the invention may readily be effected by persons skilled within the art, it is to be understood that this invention is not limited to the particular embodiment described by way of example hereinabove.

What is claimed:

1. A sheave arrangement for raising and lowering a lift car, said sheave arrangement being mounted on a static shaft and including a sheave having a first portion for receiving a cable which is coupled to the lift car, said sheave having a second portion, drive means arranged on the second portion for rotating said sheave, said sheave having a third portion, brake means on said third portion for holding said sheave stationary with respect to said shaft, said second and third portions of the sheave comprising surfaces of the sheave which are opposite one another in a plane substantially normal to the shaft so that one of the surfaces is arranged radially inwardly in said plane with respect to the other of the surfaces so that the surfaces are coplanar in said plane substantially normal to the shaft, and therefore said drive means and brake means, being coplanar in said plane substantially normal to the shaft.

2. A sheave arrangement according to claim 1 wherein the second and third portions of the sheave are outer and inner surfaces respectively of the sheave which are axially spaced from said first portion of the sheave.

3. A sheave arrangement according to claim 2 wherein the drive means is arranged adjacent to the outer surface of the sheave and the brake means is arranged adjacent to the inner surface of the sheave and includes brake shoes.

4. A sheave arrangement according to claim 3 wherein the drive means is a drive motor and the drive motor is either a synchronous motor or an induction motor.

5. A sheave arrangement according to claim 4 wherein the sheave includes support arms which extend radially outwardly from said shaft for supporting windings of said drive motor about the circumference of the outer surface of the sheave.

6. A sheave arrangement according to claim 5 wherein the support arms support actuating means, which hold said brake shoes away from the third portion of the sheave, biasing means for biasing the brake shoes towards the third portion of the sheave, said actuating means being deactivated when the lift car is stopped so that the brake shoes are biased by the biasing means against the third portion of the sheave to prevent rotation of the sheave.

7. A sheave according to claim 1 wherein the drive means is a drive motor and the drive motor is either a synchronous motor or an induction motor.

8. A sheave according to claim 7 wherein the sheave includes support arms which extend radially outwardly from said shaft for supporting windings of said drive motor about the circumference of the outer surface of the sheave.

9. A sheave according to claim 8 wherein the support means support drive means, such as solenoids, which hold said brake shoes away from the inner surface of the second portion of the sheave against the bias of biasing means, such as a spring, which bias the brake shoes towards the inner surface of the sheave, said drive means being deactivated when the lift car is stopped so that the brake shoes are biased by the biasing means against the inner surface of the sheave to prevent rotation of the sheave.

10. A sheave arrangement for raising and lowering a lift car, said sheave arrangement having a sheave mounted for rotation by a drive means, said sheave having a portion for receiving a cable which is adapted to be coupled to a llift car, drive means for rotating said sheave and brake means for stopping and holding said sheave stationary, said brake means including a brake drum, said drive means including a plurality of stationary magnetic elements and a plurality of movable magnetic elements arranged for movement relative to the stationary magnetic elements, said brake drum being arranged on one surface of a second portion of said sheave and said movable magnetic elements being supported on a second surface of said second portion of the sheave opposite said first portion to thereby arrange said brake drum and movable magnetic elements in a common plane transverse to the axis of rotation of said sheave, said brake drum thereby being arranged in proximity to said movable magnetic elements so that said brake drum and adjacent movable magnetic elements in said plurality of movable magnetic elements form a magnetic circuit.

11. A sheave arrangement for raising and lowering a llift car, said sheave arrangement having a sheave for rotation relative to a shaft, said sheave having a portion for receiving a cable which is coupled to a lift car, drive means for driving said sheave, brake means including brake shoes for stopping and holding said sheave stationary, sensor means for sensing the load on said brake means when the brake means is holding said srive means in accordance with the load sensed by the load sensing means, a support member arrnged about said shaft, said support member having a T-shaped portion, said T-shaped portion including a stem portion, strain gauges mounted on said stem portion, said brake shoes of the brake means being pivotally coupled to the T-shaped portion and configured to deform the T-shaped portion when the brake has a load applied thereto, said deformation of said T-shaped portion being proportional to the load applied thereto, said strain gauges generating a signal indicative of said deformation and therefore said load.

* * * * *